US011251857B2

(12) United States Patent
Yang et al.

(10) Patent No.: US 11,251,857 B2
(45) Date of Patent: Feb. 15, 2022

(54) SYSTEMS AND METHODS FOR SELECTING RADIO BEAMS

(71) Applicant: Verizon Patent and Licensing Inc., Basking Ridge, NJ (US)

(72) Inventors: Jin Yang, Orinda, CA (US); David Chiang, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/948,357

(22) Filed: Sep. 15, 2020

(65) Prior Publication Data

US 2020/0412438 A1 Dec. 31, 2020

Related U.S. Application Data

(63) Continuation of application No. 16/413,020, filed on May 15, 2019.

(51) Int. Cl.

| | |
|---|---|
| ***H04B 7/08*** | (2006.01) |
| ***H04B 7/0417*** | (2017.01) |
| ***H04W 28/02*** | (2009.01) |
| ***H04W 24/10*** | (2009.01) |
| ***H04W 72/08*** | (2009.01) |
| ***H04W 72/10*** | (2009.01) |
| ***H04B 17/318*** | (2015.01) |

(52) U.S. Cl.

CPC ......... *H04B 7/0857* (2013.01); *H04B 7/0417* (2013.01); *H04B 7/088* (2013.01); *H04B 17/318* (2015.01); *H04W 24/10* (2013.01); *H04W 28/0268* (2013.01); *H04W 72/085* (2013.01); *H04W 72/10* (2013.01)

(58) Field of Classification Search

CPC ... H04L 5/0032; H04B 7/0408; H04B 7/0421; H04B 7/0857; H04B 17/318; H04B 7/0417; H04B 7/088; H04W 24/10; H04W 28/0268; H04W 72/085; H04W 72/10

See application file for complete search history.

(56) References Cited

U.S. PATENT DOCUMENTS 10,340,996 B1 * 7/2019 Wakid .................... H04B 7/043
2012/0238279 A1 9/2012 Yu et al.
2019/0045414 A1 2/2019 Guerreiro et al.

* cited by examiner

*Primary Examiner* — Janice N Tieu

(57) ABSTRACT

A device may obtain, from a user equipment (UE), first information relating to one or more signal strengths measured by the UE. A signal strength of the one or more signal strengths may be associated with a beam of a radio node. The device may identify, based on the first information, a particular signal strength that is associated with a particular beam. The device may select, based on the particular beam, one or more related beams that are associated with the particular beam. The one or more related beams may be associated with the particular beam based on historical data relating to historical signal strengths measured by a plurality of UEs. The device may provide, to the UE, second information that identifies the one or more related beams selected, to permit the UE to communicate using the one or more related beams.

20 Claims, 6 Drawing Sheets

SYSTEMS AND METHODS FOR SELECTING RADIO BEAMS

RELATED APPLICATION

This application is a continuation of U.S. patent application Ser. No. 16/413,020, entitled "SYSTEMS AND METHODS FOR SELECTING RADIO BEAMS," filed May 15, 2019 (now U.S. Pat. No. 10,790,897), which is incorporated herein by reference.

BACKGROUND

Fifth generation (5G) telecommunication networks are focused on providing services at ultra-high speeds and ultra-low latencies. To achieve these production requirements, 5G networks may utilize technologies such as massive multiple input and multiple output (MIMO), beamforming, wider channels, or the like.

DETAILED DESCRIPTION OF PREFERRED EMBODIMENTS

Figure 1A:
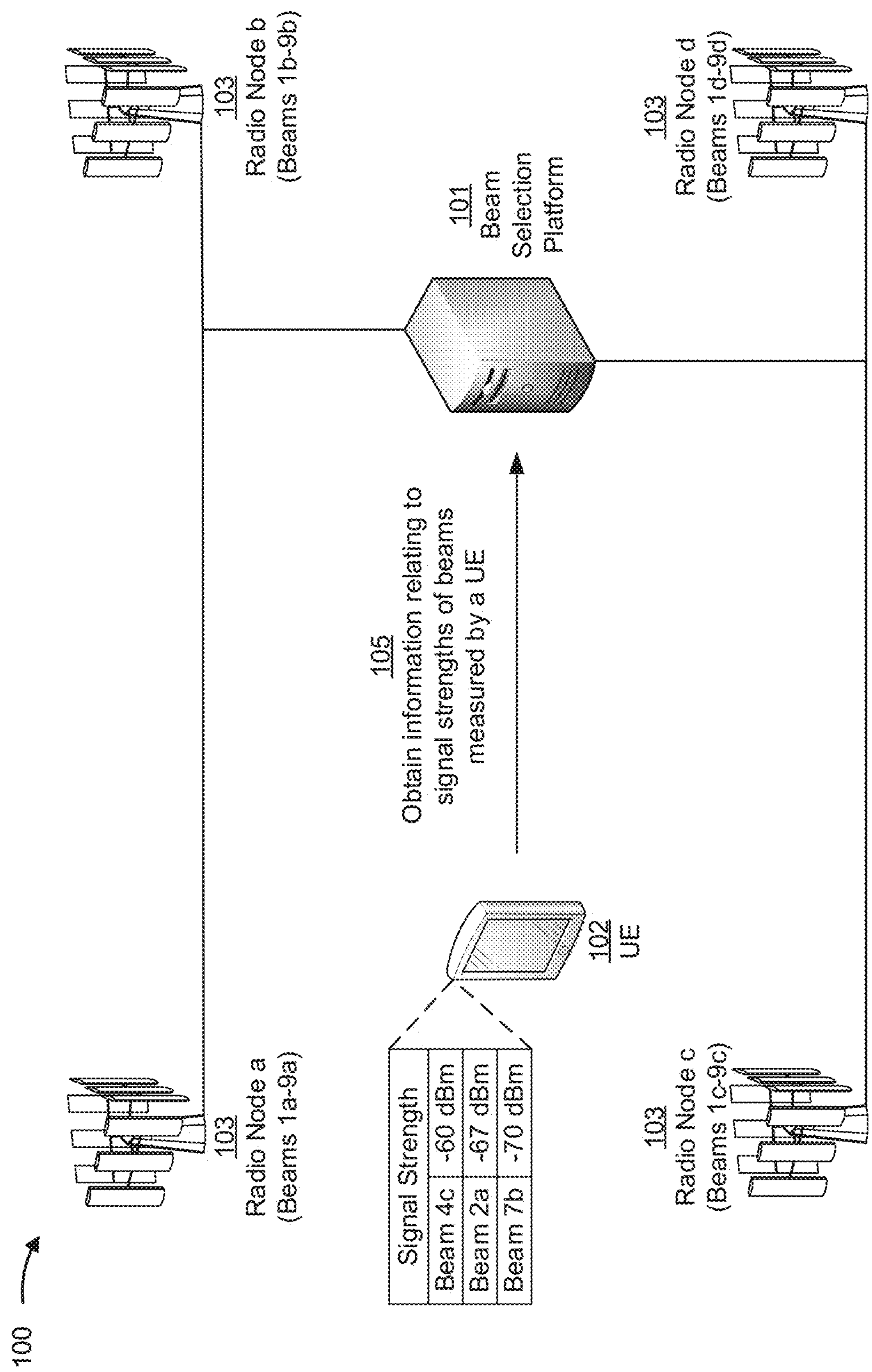
FIGS. 1A and 1B are diagrams of one or more example implementations described herein.

The following detailed description of example implementations refers to the accompanying drawings. The same reference numbers in different drawings may identify the same or similar elements.

5G telecommunication networks seek to provide high-speed, high-capacity services at low latencies by utilizing technologies such as massive MIMO, beamforming, wider channels, or the like. Massive MIMO provides a way to combine tens, hundreds, or more antennas into a single base station. The practical implication of massive MIMO is that user equipment (UE) that previously used one transmitting and receiving channel may now use up to hundreds of channels. This allows transmission of many bits in parallel, delivering a higher capacity. A base station and/or a UE may use beamforming to limit interference during these transmissions by allowing a base station to track the UE and point an antenna beam in a direction that gives the UE better signal quality. In addition, 5G networks may utilize wider channels by transmitting signals at higher frequency bands, such as the centimeter wave (cmWave) band or the millimeter wave (mmWave) band.

However, signals transmitted at the cmWave band and/or the mmWave band may not propagate as well as other frequency bands, particularly indoors where clutter, furniture, or walls may block propagation of the signals. This problem may be exacerbated when a user of a UE is moving within a building. In such a case, the UE may experience fluctuations in signal strength as different clutter, furniture, and/or wall configurations or materials are encountered. Accordingly, a UE within a building may experience poor connectivity, weak signal strength, dropped communications, and/or the like. As an alternative, the UE may communicate via lower frequency bands. However, this limits a range of available frequencies over which UEs communicate, which may cause congestion, latency, poor connectivity, and/or the like.

Some implementations describe herein provide a beam selection platform that facilitates selection of one or more radio beams for a UE in a manner that accounts for clutter, furniture, walls, and/or the like within a building. For example, by using historical data relating to historical signal strengths, the beam selection platform can determine a map of radio signal beams associated with a particular area, such as a building, and thereby account for clutter, furniture, walls, and/or the like within a building that may affect a propagation of signals transmitted. Based on signal strengths reported by a UE, and according to the map, the beam selection platform may determine a list of beams by which the UE should communicate. As the UE moves (e.g., within a building), the beam selection platform may continuously monitor signal strengths reported by the UE to determine updates to the list of beams (e.g., according to the map). In this way, the beam selection platform improves communications via the cmWave band or the mmWave band. For example, the beam selection platform facilitates indoor use of the cmWave band or the mmWave band with a level of service that might otherwise not be possible due to clutter, furniture, walls, and/or the like within a building.

Figure 1B:
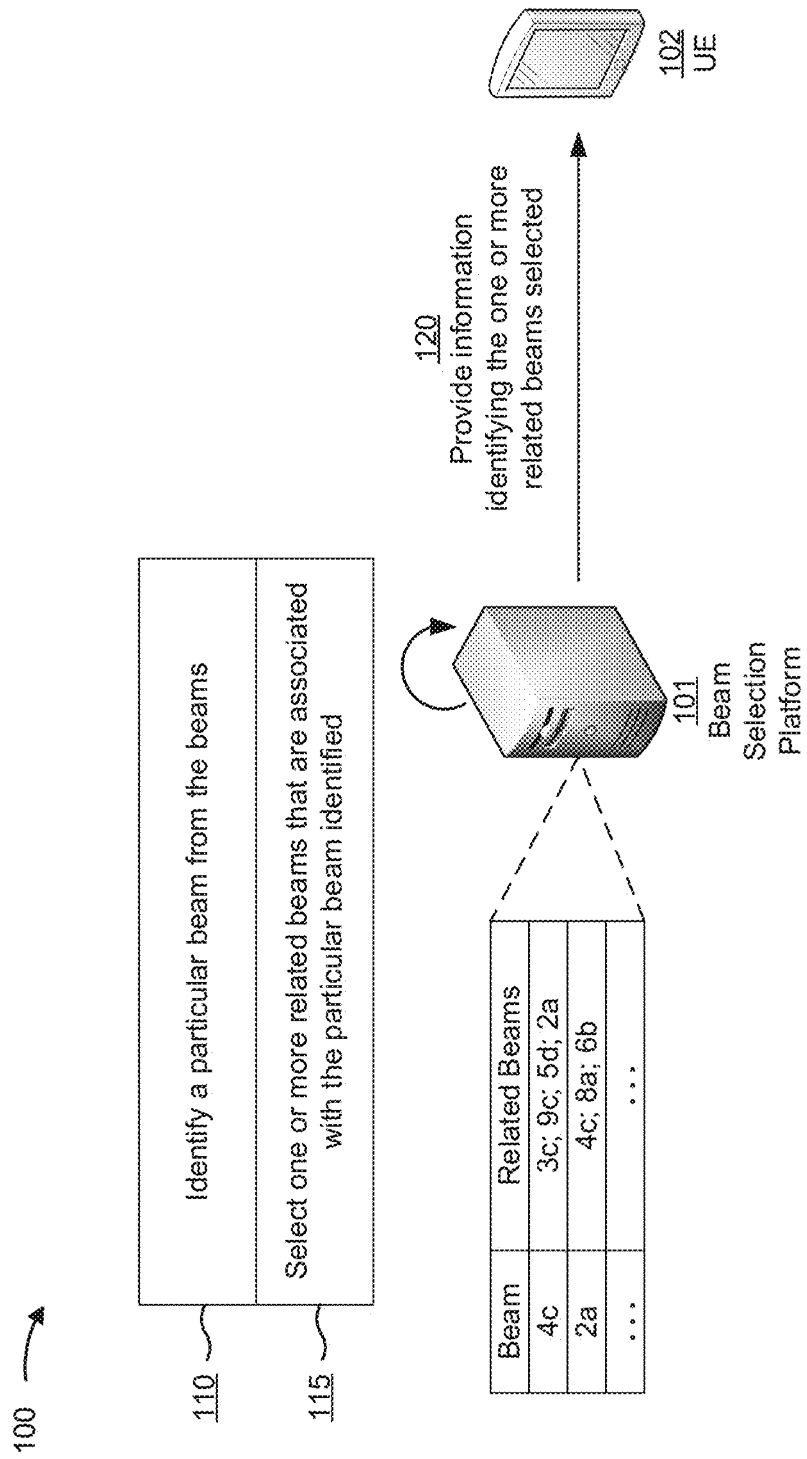

FIGS. 1A and 1B are diagrams of one or more example implementations 100 described herein. As shown in FIGS. 1A and 1B, example implementation(s) 100 may include a beam selection platform 101 and a UE 102. Beam selection platform 101 may be associated with a wireless telecommunications system (referred to herein as a "network"). For example, beam selection platform 101 may be associated with a 5G wireless telecommunications system, a 4G wireless telecommunications system, a long-term evolution (LTE) wireless telecommunications system, an LTE-Advanced (LTE-A) wireless telecommunications system, and/or the like.

Beam selection platform 101 may be implemented at an edge of the network. For example, beam selection platform 101 may be associated with a base station of a radio access network (RAN). As an example, beam selection platform 101 may be associated with one or more microcells, one or more picocells, or one or more femtocells that are associated with a building, such as an office building, a shopping mall, a sports or concert venue, a house, and/or the like. Beam selection platform 101 also may be associated with a distributed antenna system (DAS). For example, beam selection platform 101 may be associated with a central processor of a DAS. The DAS may process signals to and/or from one or more base stations of one or more RANs.

Beam selection platform 101 may include a packet data convergence protocol (PDCP) and self organizing network (SON) functionalities. In addition, beam selection platform 101 may implement one or more functions of a core network of the network. For example, beam selection platform 101 may implement an access and mobility management function (AMF), a session management function (SMF), a user plane function (UPF), and/or the like, as described below. In this way, beam selection platform 101 may provide intelligent selection of beams with improved speed and efficiency.

Beam selection platform 101 may be associated with one or more radio nodes 103 (e.g., one or more antennas, one or more small cells, and/or the like). A radio node 103 may be associated with one or more radio transmitters that produce radio beams. A single radio transmitter may be associated with a single radio beam of the radio node 103, or multiple radio transmitters may be associated with a single radio beam of the radio node 103 (e.g., a beam formed by the multiple radio transmitters). A radio node 103 may be located within an area, such as within a building. The one or more radio nodes 103 may communicate with beam selection platform 101 via an F1 interface.

As shown in FIG. 1A, and by reference number 105, beam selection platform 101 may obtain information relating to one or more signal strengths measured by UE 102. For example, UE 102 may transmit a message to beam selection platform 101 (e.g., via radio resource control (RRC) signaling) that includes information relating to one or more signal strengths measured by UE 102. The information may include reference signal received power (RSRP) measurements. For example, the RSRP measurements may indicate one or more beams for which UE 102 is detecting a signal. The RSRP measurements may provide a level of a signal strength detected for a beam (e.g., in decibel-milliwatts (dBm)) to permit beam selection platform 101 to determine a first beam associated with a highest signal strength, a second beam associated with a second highest signal strength, and so forth. The RSRP measurements may identify a beam by a beam identifier and a radio node identifier (e.g., a radio node identifier of a radio node 103 associated with the beam).

As shown in FIG. 1B, and by reference number 110, beam selection platform 101 may identify a particular beam from the one or more beams for which UE 102 is detecting a signal. In other words, beam selection platform 101 may identify a particular signal strength from the one or more signal strengths measured by UE 102 and determine a particular beam that is associated with the particular signal strength identified. The particular signal strength may be a highest signal strength of the one or more signal strengths measured by UE 102. In some implementations, beam selection platform 101 may identify a plurality of signal strengths of the one or more signal strengths measured by UE 102. For example, beam selection platform 101 may identify a highest signal strength, a second highest signal strength, a third highest signal strength, and/or the like. In such a case, beam selection platform 101 may determine a plurality of particular beams associated the plurality of signal strengths identified.

In this way, beam selection platform 101 can determine an approximate location of UE 102 based on the particular signal strength identified or the plurality of signal strengths identified. For example, a particular location within a building may be associated with a particular combination of signal strength measurements. Accordingly, beam selection platform 101 may determine an approximate location of UE 102 within the building based on the particular combination of signal strengths measured by UE 102.

As shown by reference number 115, beam selection platform 101 may select one or more related beams (e.g., neighboring beams) that are associated with the particular beam that is determined (or a plurality of particular beams that are determined). Beam selection platform 101 may select the one or more related beams according to an association between a particular beam (e.g., a beam associated with a highest signal strength) and one or more related beams. Beam selection platform 101 may determine an association based on beam data, node data, and/or signal strength data (e.g., historical beam data, node data, and/or signal strength data).

Beam selection platform 101 may determine beams and/or radio nodes 103 that are associated with an area (e.g., a building) based on beam data and/or node data. For example, beam selection platform 101 may obtain, from a UE (e.g., an automatic neighbor relation function of the UE), data relating to beams and/or radio nodes 103 detected in an area of the UE. In this way, beam selection platform 101 may identify (e.g., using an automatic neighbor relation function of beam selection platform 101) beams and/or radio nodes 103 associated with the area to thereby generate and/or update a list of beams and/or radio nodes 103 associated with the area. For example, beam selection platform 101 may determine whether the data relating to beams and/or radio nodes 103 detected in the area identifies a beam and/or a radio node 103 that is unknown (e.g., missing from the list), and may update the list based on determining that the beam and/or the radio node 103 is unknown.

In addition, beam selection platform 101 may generate and/or update the list of beams and/or radio nodes 103 associated with the area based on the information relating to the one or more signal strengths measured by UE 102. In such a case, beam selection platform 101 may determine whether a signal strength of the one or more signal strengths relates to a beam and/or a radio node 103 that is unknown (e.g., missing from the list), and may update the list based on determining that the beam and/or the radio node 103 is unknown.

Beam selection platform 101 may generate and/or update the list of beams and/or radio nodes 103 associated with the area based on data from a plurality of UEs. In this way, over time, beam selection platform 101 can identify a list of beams and/or radio nodes 103 that serve an area, such as a building, as well as update the list with new beams and/or radio nodes 103 that are detected.

Furthermore, beam selection platform 101 may obtain network performance data and determine beams and/or radio nodes 103 that are associated with an area (e.g., a building) based on the network performance data. For example, if the network performance data indicates that a UE moving within an area experienced a dropped call from a particular beam and/or radio node 103 (e.g., due to a failure to handover the call to another beam and/or radio node 103), beam selection platform 101 may determine from the network performance data that the particular beam and/or radio node 103 is missing from the list of beams and/or radio nodes 103 associated with the area and update the list.

Beam selection platform 101 may determine an association between a particular beam and one or more related beams. For example, beam selection platform 101 may determine the association in connection with a particular quality of service (QoS) flow and/or a particular network slice. Thus, a particular beam may be associated with a first set of related beams in connection with a first QoS flow and/or network slice and the particular beam may be associated with a second set of related beams in connection with a second QoS flow and/or network slice. For example, beam selection platform 101 may determine (e.g., based on historical data) that UEs communicate using a plurality of particular beams in connection with a particular network slice, and thereby determine that the plurality of particular beams are associated with the particular network slice.

Beam selection platform 101 may determine an association between a particular beam and one or more related beams based on signal strength data (e.g., historical signal strength data from a plurality of UEs) for the beams and/or radio nodes 103 associated with the area. For example, beam selection platform 101 may determine that a first beam is associated with a second beam (e.g., in connection with a particular QoS flow or a particular network slice) when the first beam is associated with a highest signal strength measured by a UE, and the second beam is associated with a second highest signal strength measured by the UE, a third highest signal strength measured by the UE, or the like. As another example, the beam selection platform may determine that a plurality of beams are associated with one another (e.g., in connection with a particular QoS flow or a particular network slice) when the plurality of beams are associated with signal strengths, as measured by a UE, that satisfy a threshold value.

Based on numerous signal strength measurements from a plurality of UEs and from various locations in an area (e.g., a building), beam selection platform 101 can approximate locations, directions, shapes, strengths, and/or the like of a plurality of beams in the area (e.g., beam selection platform 101 can generate a radio map for the area). Thus, based on a highest signal strength measured by UE 102, a second highest signal strength measured by UE 102, and/or the like, beam selection platform 101 can determine an approximate location of UE 102 in the area. In this way, beam selection platform 101 may select one or more related beams for UE 102 in a manner that accounts for clutter, furniture, walls, and/or the like that may obstruct signals between UE 102 and a radio node 103.

Beam selection platform 101 may determine an order of priority among a plurality of related beams. For example, for a particular beam, beam selection platform 101 may determine an order of priority for a plurality of related beams. The order of priority may represent an order of priority in which the plurality of related beams are to be used by UE 102 instead of the particular beam, or an order of priority in which the plurality of related beams are to be used by UE 102 in addition to the particular beam. The order of priority may be based upon historical signal strength data, whereby a related beam associated with a higher historical signal strength in relation to the particular beam is given a higher priority among the plurality of related beams. Additionally, or alternatively, the order of priority may be based upon historical communications of the plurality of UEs via the one or more related beams. For example, the historical communications may be associated with data, such as QoS data, upon which the order of priority may be based.

Beam selection platform 101 may select a subset of one or more related beams associated with a particular beam. For example, beam selection platform 101 may determine a subset of the one or more related beams that includes beams that are likely to provide strong signals and/or a particular QoS for UE 102. Beam selection platform 101 may determine beams that are likely to provide strong signals and/or the particular QoS based on historical signal strength data (e.g., historical signal strength data that satisfies a threshold value associated with a strong signal) and/or QoS data.

In some implementations, beam selection platform 101 may select one or more related beams based on signal strength data for a plurality of particular beams. For example, beam selection platform 101 may select the one or more related beams based on a signal strength signature defined by the plurality of particular beams. A signal strength signature may be defined according to a particular combination of relative signal strengths among the plurality of particular beams. As an example, assume that a first beam, a second beam, and a third beam serve an area (e.g., a building). A first signal strength signature may be associated with a first location of the area where the second beam has a highest signal strength, the first beam has a second highest signal strength, and the third beam has a third highest signal strength. Similarly, a second signal strength signature may be associated with a second location of the area where the third beam has a highest signal strength, the second beam has a second highest signal strength, and the first beam has a third highest signal strength. A signal strength signature may be further defined according to signal strength levels (e.g., in dBm) of the plurality of particular beams, signal strength differences (e.g., percentage differences) between the plurality of particular beams, and/or the like. Based on a signal strength signature, beam selection platform 101 may select one or more related beams.

Beam selection platform 101 may select the one or more related beams in connection with a particular QoS flow and/or a particular network slice. For example, beam selection platform 101 may determine that a communication session of UE 102 is associated with a particular QoS flow and/or a particular network slice (e.g., based on application and/or service information communicated by UE 102). Continuing with the previous example, beam selection platform 101 may determine a particular beam based on signal strength measurements of UE 102, and select one or more related beams that are associated with the particular beam in connection with the particular QoS flow and/or the particular network slice of the communication session.

In some implementations, beam selection platform 101 may select the one or more related beams using a machine learning technique. For example, beam selection platform 101 may obtain thousands, millions, billions, or more signal strength measurements (e.g., from a plurality of UEs) relating to an area, and may generate a model of beam selection (or receive a model trained elsewhere). In this case, beam selection platform 101 may use the model of beam selection to automatically determine one or more related beams based on signal strength measurements of UE 102. For example, based on a highest signal strength measured by UE 102, beam selection platform 101, using the model of beam selection, may determine one or more related beams for UE 102.

As shown by reference number 120, beam selection platform 101 may provide, to UE 102, information relating to the one or more related beams selected. For example, beam selection platform 101 may provide, to UE 102, the information relating to the one or more related beams selected to permit UE 102 to communicate via the one or more related beams. The information relating to the one or more related beams may include an order of priority among the one or more related beams, as described above. Alternatively, the information relating to the one or more beams may include an order of priority among the one or more related beams and a particular beam (e.g., a particular beam having a highest signal strength) identified by beam selection platform 101.

UE 102 may communicate via the one or more related beams (e.g., at least two beams of the one or more related beams) instead of communicating via a particular beam (or another beam associated with the one or more signal strengths measured by UE 102) identified by beam selection platform 101. For example, UE 102 may communicate via the one or more related beams instead of communicating via the particular beam when the one or more related beams have historically stronger signal strengths than the particular beam at a location of UE 102 (e.g., a location of UE 102 determined based on signal strength measurements, as described above). Additionally, or alternatively, UE 102 may communicate via the one or more related beams and the particular beam. For example, UE 102 may communicate via the one or more related beams (e.g., at least one beam of the one or more related beams) and the particular beam when the one or more related beams have historically stronger or weaker signal strengths than the particular beam at a location of UE 102. In this way, beam selection platform 101 facilitates massive MIMO communications, thereby improving throughput, latency, spectrum efficiency, and/or the like.

Beam selection platform 101 may continuously monitor signal strength measurements provided by UE 102 (e.g., when UE 102 is moving within an area, such as a building). A change in signal strength measurements may indicate that a location of UE 102 has changed. For example, a first location in an area may be associated with first signal strength measurements of UE 102 and a second location in the area may be associated with second signal strength measurements of UE 102.

Based on a change to one or more signal strengths measured by UE 102, beam selection platform 101 may select one or more new related beams and may provide updated information relating to the one or more new related beams to UE 102. In this way, beam selection platform 101 facilitates efficient handover as UE 102 changes locations within an area.

Beam selection platform 101 may obtain data relating to communications of UE 102 (e.g., QoS data) using the one or more beams selected for UE 102. Beam selection platform 101 may use such data to update associations between beams, update an order of priority for associated beams, and/or the like.

Although FIGS. 1A and 1B describe a beam selection platform as processing various types of data, an edge device (e.g., a server device) deployed at an edge of a network (e.g., as part of the beam selection platform or separate from the beam selection platform) may perform processing, described herein, of one or more of the various types of data. A 5G network (or another network protocol) may be utilized to connect an edge device with a beam selection platform, a radio node, a UE, and/or the like to reduce a latency of data communications, to conserve bandwidth, and/or the like. In this way, various functions relating to selecting related beams may be integrated by the edge device to facilitate efficient and speedy selection of related beams and communication of the related beams to a UE.

As indicated above, FIGS. 1A and 1B are provided merely as examples. Other examples may differ from what is described with regard to FIGS. 1A and 1B. The number and arrangement of devices shown in FIGS. 1A and 1B are provided as an example. In practice, there may be additional devices, fewer devices, different devices, or differently arranged devices than those shown in FIGS. 1A and 1B. Furthermore, two or more devices shown in FIGS. 1A and 1B may be implemented within a single device, or a single device shown in FIGS. 1A and 1B may be implemented as multiple, distributed devices. Additionally, or alternatively, a set of devices (e.g., one or more devices) shown in FIGS. 1A and 1B may perform one or more functions described as being performed by another set of devices shown in FIGS. 1A and 1B.

Figure 2:
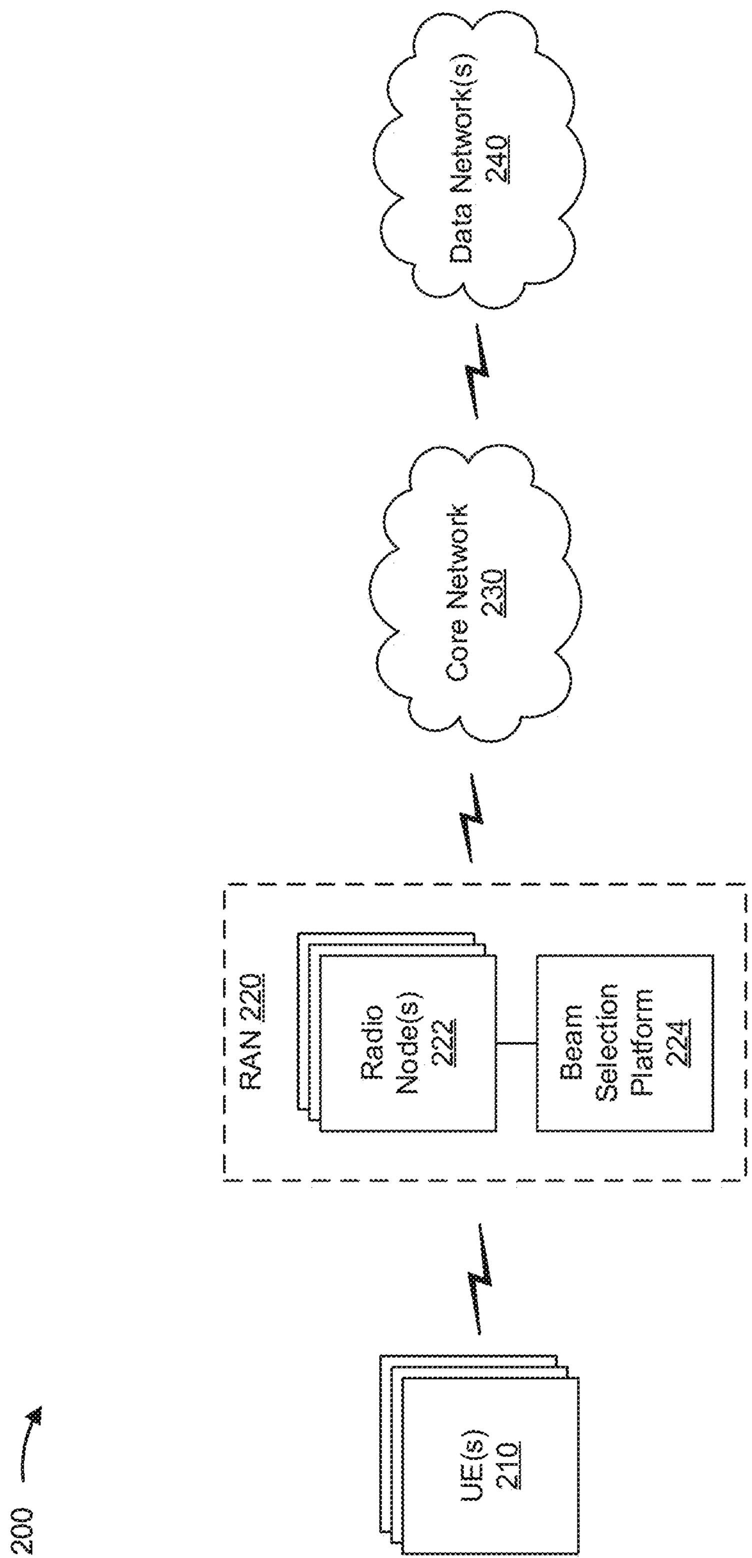
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a UE 210, a RAN 220, a radio node 222, a beam selection platform 224, a core network 230, and a data network 240. Devices of environment 200 may interconnect via wired connections, wireless connections, or a combination of wired and wireless connections.

UE 210 includes one or more devices capable of communicating with RAN 220 and/or a data network 240 (e.g., via core network 230). For example, UE 210 may include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 210 may be capable of communicating using uplink (e.g., UE to RAN) communications, downlink (e.g., RAN to UE) communications, and/or sidelink (e.g., UE-to-UE) communications. In some implementations, UE 210 may include a machine-type communication (MTC) UE, such as an evolved or enhanced MTC (eMTC) UE. In some implementations, UE 210 may include an Internet of things (IoT) UE, such as a narrowband IoT (NB-IoT) UE and/or the like.

RAN 220 includes one or more devices capable of communicating with UE 210 using a cellular radio access technology (RAT). For example, RAN 220 may include a radio node 222 and a beam selection platform 224. Radio node 222 and/or beam selection platform 224 may include a base station, a base transceiver station, a radio base station, a node B, an evolved node B (eNB), a next generation node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. In some implementations, radio node 222 and/or beam selection platform 224 have the same characteristics and functionality of RAN 220, and vice versa. RAN 220 may transfer traffic between UE 210 (e.g., using a cellular RAT), one or more other RANs 220 (e.g., using a wireless interface or a backhaul interface, such as a wired backhaul interface), and/or core network 230. RAN 220 may provide one or more cells that cover geographic areas. Some RANs 220 may be mobile base stations. Some RANs 220 may be capable of communicating using multiple RATs.

In some implementations, RAN 220 can perform scheduling and/or resource management for UEs 210 covered by RAN 220 (e.g., UEs 210 covered by a cell provided by RAN 220). In some implementations, RAN 220 may be controlled or coordinated by a network controller, which may perform load balancing, network-level configuration, and/or the like. The network controller may communicate with RAN 220 via a wireless or wireline backhaul. In some implementations, RAN 220 may include a network controller, a SON module or component, or a similar module or component. In other words, RAN 220 may perform network control, scheduling, and/or network management functions (e.g., for other RAN 220 and/or for uplink, downlink, and/or sidelink communications of UEs 210 covered by RAN 220). In some implementations, RAN 220 may apply network slice policies to perform the network control, scheduling, and/or network management functions. In some implementations, RAN 220 may include a central unit and multiple distributed units. The central unit may coordinate access control and communication with regard to the multiple distributed units. The multiple distributed units can provide UEs 210 and/or other RANs 220 with access to data network 240 via core network 230.

Core network 230 includes various types of core network architectures, such as a 5G Next Generation (NG) Core (e.g., core network 300 of FIG. 3), a Long-Term Evolution (LTE) Evolved Packet Core (EPC), and/or the like. In some implementations, core network 230 may be implemented on physical devices, such as a gateway, a mobility management entity, and/or the like. In some implementations, the hardware and/or software implementing core network 230 may be virtualized (e.g., through the use of network function virtualization and/or software-defined networking), thereby allowing for the use of composable infrastructure when implementing core network 230. In this way, networking, storage, and compute resources can be allocated to implement the functions of core network 230 (described with regard to FIG. 3) in a flexible manner as opposed to relying on dedicated hardware and software to implement these functions.

Data network 240 includes one or more wired and/or wireless data networks. For example, data network 240 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
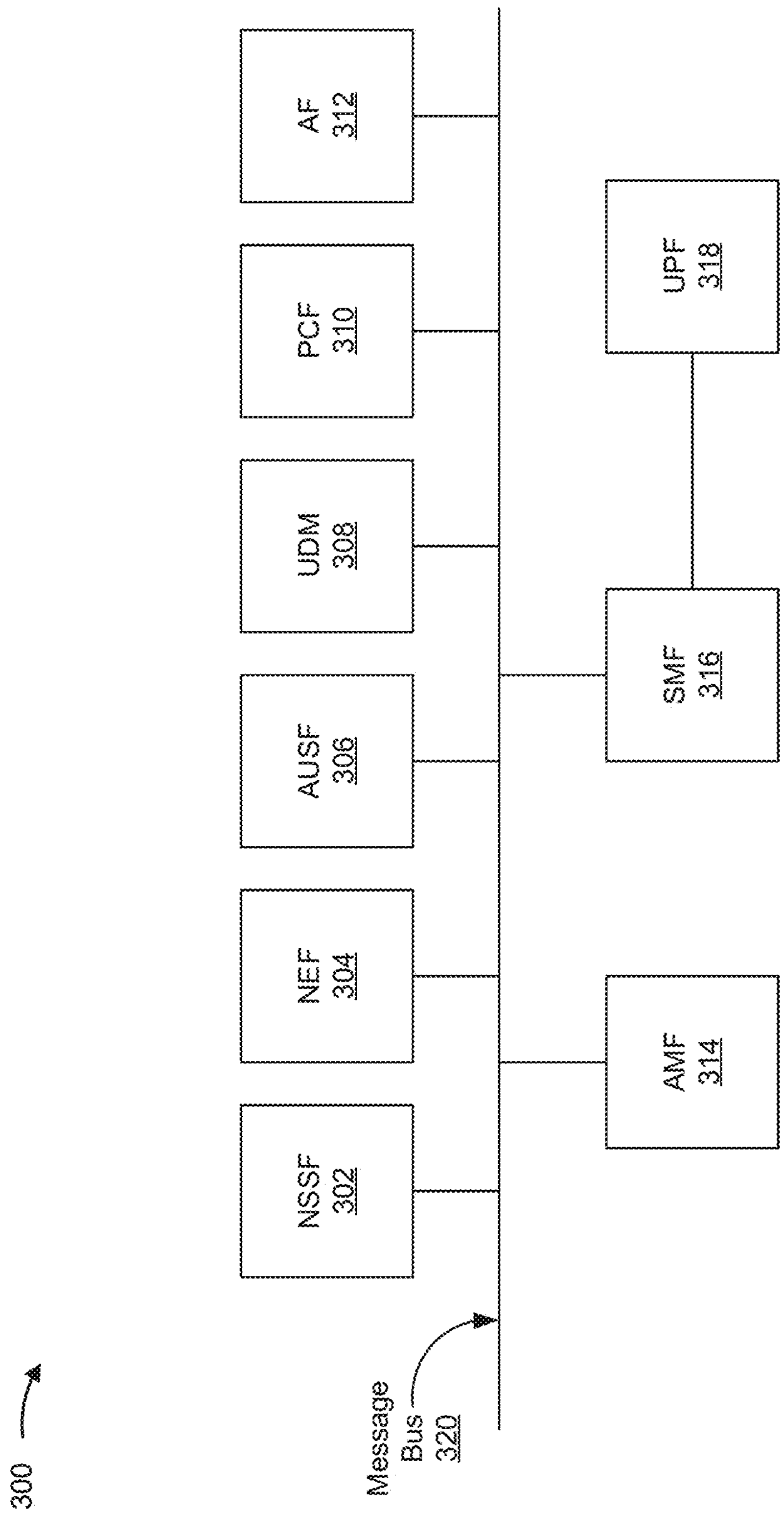
FIG. 3 is a diagram of an example functional architecture of an example core network described herein.

FIG. 3 is a diagram of an example functional architecture of a core network 300 in which systems and/or methods described herein can be implemented. For example, FIG. 3 can show an example functional architecture of a 5G NG core network included in a 5G wireless telecommunications system. In some implementations, the example functional architecture can be implemented by a core network (e.g., core network 230 of FIG. 2) and/or one or more devices (e.g., a device described with respect to FIG. 4). While the example functional architecture of core network 300 shown in FIG. 3 can be an example of a service-based architecture, in some implementations, core network 300 can be implemented as a reference-point architecture.

As shown in FIG. 3, core network 300 includes a number of functional elements. The functional elements may include, for example, a network slice selection function (NSSF) 302, a network exposure function (NEF) 304, an authentication server function (AUSF) 306, a unified data management (UDM) component 308, a policy control function (PCF) 310, an application function (AF) 312, an AMF 314, a SMF 316, and a UPF 318. These functional elements may be communicatively connected via a message bus 320, which may be comprised of one or more physical communication channels and/or one or more virtual communication channels. Each of the functional elements shown in FIG. 3 is implemented on one or more devices associated with a wireless telecommunications system. In some implementations, one or more of the functional elements may be implemented on physical devices, such as an access point, a base station, a gateway, a server, and/or the like. In some implementations, one or more of the functional elements may be implemented on one or more computing devices of a cloud computing environment associated with the wireless telecommunications system. In some implementations, the core network 300 may be operatively connected to a RAN 220, a data network 240, and/or the like, via wired and/or wireless connections with UPF 318.

NSSF 302 may select network slice instances for UEs, where NSSF 302 may determine a set of network slice policies to be applied at the RAN 220. By providing network slicing, NSSF 302 allows an operator to deploy multiple substantially independent end-to-end networks potentially with the same infrastructure. In some implementations, each slice may be customized for different services. NEF 304 may support the exposure of capabilities and/or events in the wireless telecommunications system to help other entities in the wireless telecommunications system discover network services and/or utilize network resources efficiently.

AUSF 306 may act as an authentication server and support the process of authenticating UEs in the wireless telecommunications system. UDM 308 may store subscriber data and profiles in the wireless telecommunications system. UDM 308 may be used for fixed access, mobile access, and/or the like, in core network 300. PCF 310 may provide a policy framework that incorporates network slicing, roaming, packet processing, mobility management, and/or the like.

AF 312 may determine whether UEs provide preferences for a set of network slice policies and support application influence on traffic routing, access to NEF 304, policy control, and/or the like. AMF 314 may provide registration and mobility management of UEs.

SMF 316 may support the establishment, modification, and release of communications sessions in the wireless telecommunications system. For example, SMF 316 may configure traffic steering policies at UPF 318, enforce UE IP address allocation and policies, and/or the like. AMF 314 and SMF 316 may act as a termination point for non-access stratum (NAS) signaling, mobility management, and/or the like. SMF 316 may act as a termination point for session management related to NAS. RAN 220 may send information (e.g. the information that identifies the UE) to AMF 314 and/or SMF 316 via PCF 310. As described herein, SMF 316 may communicate information identifying a QoS flow to UE 210, RAN 220, UPF 318, and/or the like.

UPF 318 may serve as an anchor point for intra/inter RAT mobility. UPF 318 may apply rules to packets, such as rules pertaining to packet routing, traffic reporting, handling user plane QoS, and/or the like. UPF 318 may determine an attribute of application-specific data that is communicated in a communications session. UPF 318 may receive information (e.g., the information that identifies the communications attribute of the application) from RAN 220 via SMF 316 or an application programming interface (API). Message bus 320 represents a communication structure for communication among the functional elements. In other words, message bus 320 may permit communication between two or more functional elements. Message bus 320 may be a message bus, a hypertext transfer protocol 2 (HTTP/2) proxy server, and/or the like.

RAN 220 may be operatively connected, via a wired and/or wireless connection, to the core network 300 through UPF 318. RAN 220 may facilitate communications sessions between UEs and data network 240 by communicating application-specific data between RAN 220 and core network 300. In some implementations, one or more functions of core network 300 may be performed by beam selection platform 224.

The number and arrangement of functional elements shown in FIG. 3 are provided as an example. In practice, there can be additional functional elements, fewer functional elements, different functional elements, or differently arranged functional elements than those shown in FIG. 3. Furthermore, two or more functional elements shown in FIG. 3 can be implemented within a single device, or a single functional element shown in FIG. 3 can be implemented as multiple, distributed devices. Additionally, or alternatively, a set of functional elements (e.g., one or more functional elements) of core network 300 can perform one or more functions described as being performed by another set of functional elements of core network 300.

Figure 4:
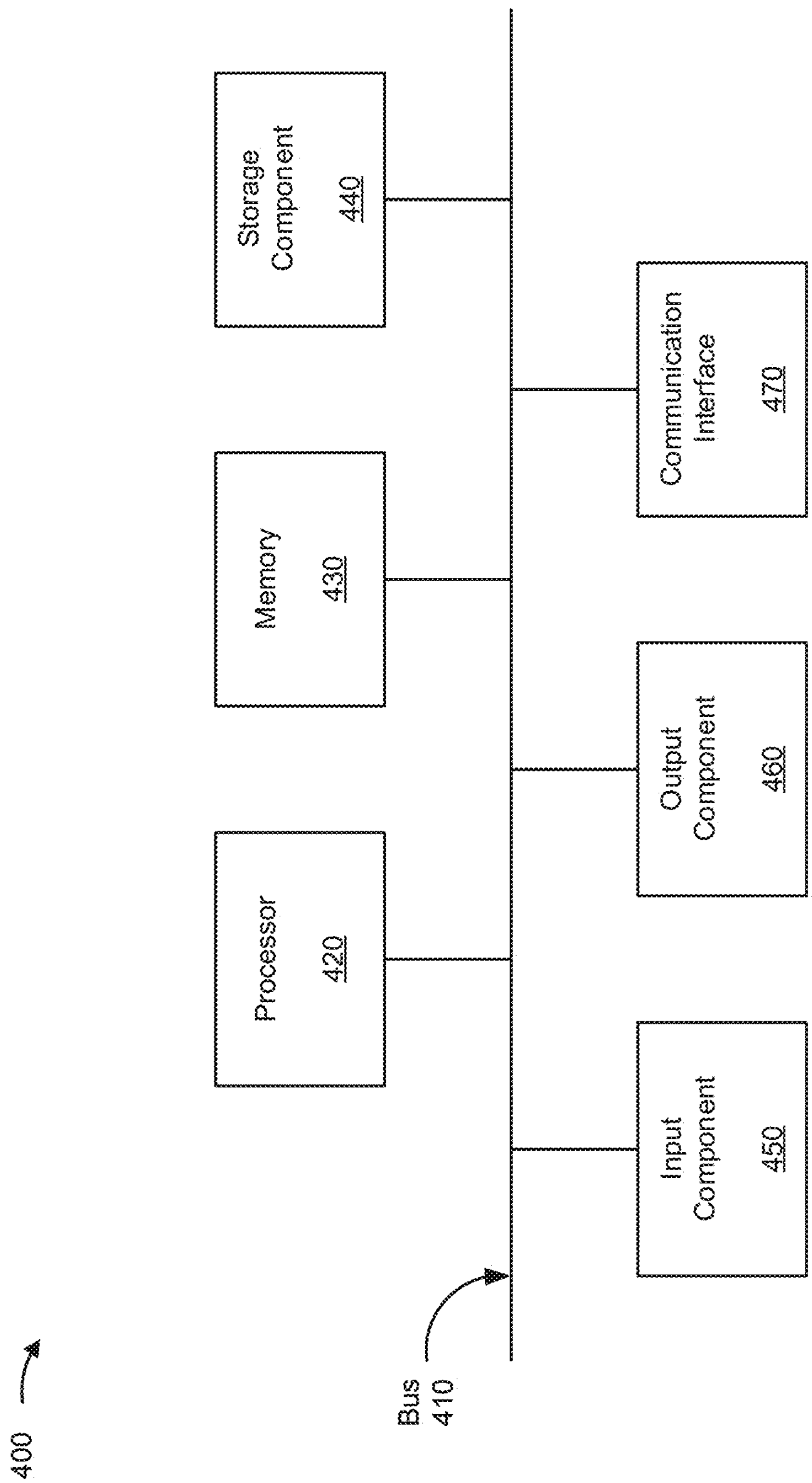
FIG. 4 is a diagram of example components of one or more devices of FIG. 2.

FIG. 4 is a diagram of example components of a device 400. Device 400 may correspond UE 210, radio node 222, beam selection platform 224, NSSF 302, NEF 304, AUSF 306, UDM 308, PCF 310, AF 312, AMF 314, SMF 316, UPF 318, and/or message bus 320. In some implementations, UE 210, radio node 222, beam selection platform 224, NSSF 302, NEF 304, AUSF 306, UDM 308, PCF 310, AF 312, AMF 314, SMF 316, UPF 318, and/or message bus 320 may include one or more devices 400 and/or one or more components of device 400. As shown in FIG. 4, device 400 can include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random-access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 can include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 can include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 can permit device 400 to receive information from another device and/or provide information to another device. For example, communication interface 470 can include an Ethernet interface, an optical interface, a coaxial interface, an infrared interface, a radio frequency (RF) interface, a universal serial bus (USB) interface, a wireless local area network interface, a cellular network interface, and/or the like.

Device 400 can perform one or more processes described herein. Device 400 can perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions can be read into memory 430 and/or storage component 440 from another computer-readable medium or from another device via communication interface 470. When executed, software instructions stored in memory 430 and/or storage component 440 can cause processor 420 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 can include additional components, fewer components, different components, or differently arranged components than those shown in FIG. 4. Additionally, or alternatively, a set of components (e.g., one or more components) of device 400 can perform one or more functions described as being performed by another set of components of device 400.

Figure 5:
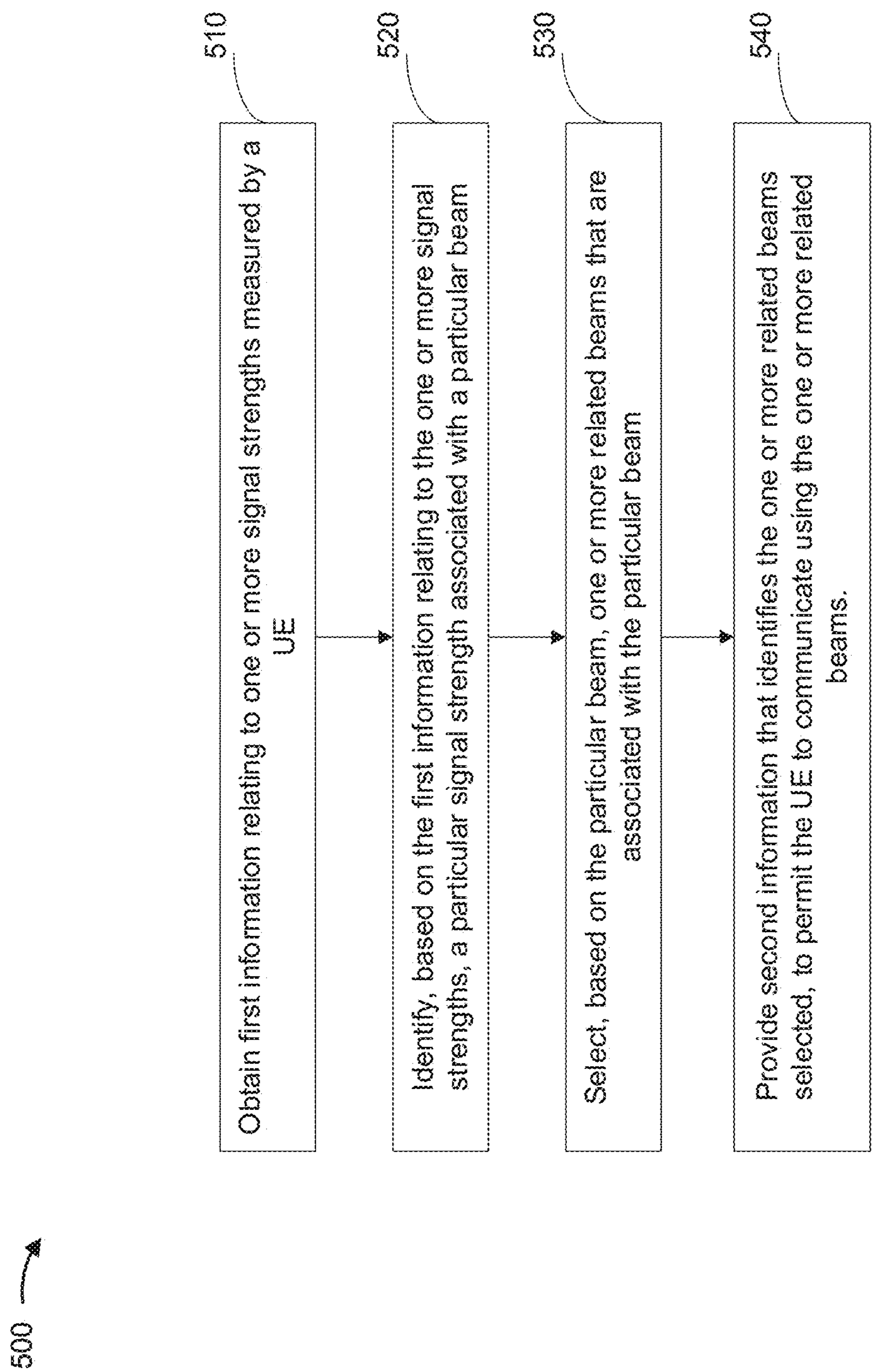
FIG. 5 is a flow chart of an example process for selecting radio beams.

FIG. 5 is a flow chart of an example process 500 for selecting radio beams. In some implementations, one or more process blocks of FIG. 5 may be performed by a beam selection platform (e.g., beam selection platform 224). In some implementations, one or more process blocks of FIG. 5 may be performed by another device or a group of devices separate from or including the beam selection platform, such as a UE (e.g., UE 210), a radio node (e.g., radio node 222), one or more components or functions (e.g., NSSF 302, NEF 304, AUSF 306, UDM 308, PCF 310, AF 312, AMF 314, SMF 316, UPF 318) of a core network (e.g., core network 300), and/or the like.

As shown in FIG. 5, process 500 may include obtaining first information relating to one or more signal strengths measured by a UE (block 510). For example, the beam selection platform (e.g., using processor 420, memory 430, storage component 440, input component 450, communication interface 470, and/or the like) may obtain first information relating to one or more signal strengths measured by a UE, as described above. A signal strength of the one or more signal strengths may be associated with a beam of a radio node. The UE may be associated with a communication session, and the communication session may be associated with a QoS flow and/or a network slice. The radio node may be located within a same building as the UE.

As further shown in FIG. 5, process 500 may include identifying, based on the first information relating to the one or more signal strengths, a particular signal strength associated with a particular beam (block 520). For example, the beam selection platform (e.g., using processor 420, memory 430, storage component 440, and/or the like) may identify, based on the first information relating to the one or more signal strengths, a particular signal strength, as described above. The particular signal strength identified may be a highest signal strength of the one or more signal strengths.

In some implementations, the particular signal strength may be a first particular signal strength, and when identifying the particular signal strength, the beam selection platform may identify the first particular signal strength and a second particular signal strength.

As further shown in FIG. 5, process 500 may include selecting, based on the particular beam, one or more related beams that are associated with the particular beam (block 530). For example, the beam selection platform (e.g., using processor 420, memory 430, storage component 440, and/or the like) may select, based on the particular beam, one or more related beams that are associated with the particular beam, as described above. The one or more related beams may be associated with the particular beam based on historical data relating to historical signal strengths measured by a plurality of UEs. The historical signal strengths may be associated with the particular beam and the one or more related beams. The one or more related beams may be associated with the particular beam based on the historical data relating to the historical signal strengths measured by the plurality of UEs during communications via a QoS flow and/or a network slice.

In some implementations, the particular signal strength may be a first particular signal strength, and when selecting the one or more related beams, the beam selection platform may select the one or more related beams that are associated with the first particular signal strength and/or the second particular signal strength.

As further shown in FIG. 5, process 500 may include providing second information that identifies the one or more related beams selected, to permit the UE to communicate using the one or more related beams (block 540). For example, the beam selection platform (e.g., using processor 420, memory 430, storage component 440, output component 460, communication interface 470, and/or the like) may provide second information that identifies the one or more related beams selected, to permit the UE to communicate using the one or more related beams, as described above. In some implementations, the second information may permit the UE to communicate via a QoS flow and/or a network slice using the one or more related beams. The second information may permit the UE to communicate using at least one of a first combination that includes at least two of the one or more related beams or a second combination that includes the particular beam and at least one of the one or more related beams.

The second information may identify the one or more related beams in an order according to a priority of the one or more related beams. The priority may be based on the historical signal strengths. Alternatively, the priority may be based on historical communications of the plurality of UEs via the one or more related beams.

In some implementations, the beam selection platform may determine whether the one or more signal strengths measured by the UE relate to an unknown beam that is not associated with the particular beam, and selectively associate, based on whether the unknown beam is determined, the unknown beam with the particular beam. In addition, the beam selection platform may obtain (e.g., after determining that the one or more signal strengths measured by the UE do not relate to the unknown beam) third information relating to a plurality of beams detected by the UE, determine whether the plurality of beams include an unknown beam that is not associated with the particular beam, and selectively associate, based on whether the unknown beam is determined, the unknown beam with the particular beam.

Process 500 may include additional implementations, such as any single implementation or any combination of implementations described above and/or in connection with one or more other processes described elsewhere herein.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with “one or more.” Furthermore, as used herein, the term “set” is intended to include one or more items (e.g., related items, unrelated items, a combination of related and unrelated items, etc.), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise.

What is claimed is:

1. A method comprising:

obtaining, by a device and from a user equipment (UE), first information relating to a particular signal strength associated with a particular beam;

determining, based on historical data, that the particular beam and one or more related beams are associated with one or more of:

a particular network slice, or a particular quality of service (QoS) flow;

selecting, by the device and based on the particular beam, the one or more related beams that are associated with the particular beam based on the determination; and providing, by the device and to the UE, second information that identifies the one or more related beams selected, to permit the UE to communicate using the one or more related beams.

2. The method of claim 1, wherein the one or more related beams are associated with the particular beam based on historical signal strengths associated with the one or more related beams satisfying a threshold value.

3. The method of claim 1, further comprising:

determining, based on the historical data, an order of priority among the one or more related beams, wherein the historical data, upon which the order of priority is based, includes at least one of:

historical signal strengths associated with the one or more related beams, or

QoS data associated with the one or more related beams; and wherein the second information is based on the order of priority.

4. The method of claim 1, further comprising:

monitoring signal strength measurements provided by the UE;

determining, based on the monitoring, that a location of the UE changed;

selecting, based on determining that the location of the UE changed, one or more other related beams; and providing the UE with updated information relating to the one or more other related beams.

5. The method of claim 1, further comprising:

determining a signal signature based on the particular signal strength of the particular beam; and wherein selecting the one or more related beams further comprises:

selecting the one or more related beams further based on the signal signature.

6. The method of claim 5, further comprising:

determining another signal strength of another beam; and wherein determining the signal signature comprises:

determining the signal signature further based on the other signal strength of the other beam.

7. The method of claim 1, wherein the historical data relates to historical signal strengths associated with the particular beam and the one or more related beams.

8. A non-transitory computer-readable medium storing a set of instructions, the set of instructions comprising:

one or more instructions that, when executed by one or more processors of a device, cause the device to:

obtain, from a user equipment (UE), first information relating to a particular signal strength associated with a particular beam;

determine, based on historical data, that the particular beam and one or more related beams are associated with one or more of:

a particular network slice, or a particular quality of service (QoS) flow;

select, based on the particular beam, the one or more related beams that are associated with the particular beam based on the determination; and provide, to the UE, second information that identifies the one or more related beams selected, to permit the UE to communicate using the one or more related beams.

9. The non-transitory computer-readable medium of claim 8, wherein the one or more related beams are associated with the particular beam based on historical signal strengths associated with the one or more related beams satisfying a threshold value.

10. The non-transitory computer-readable medium of claim 8, wherein the one or more instructions further cause the device to:

determine, based on the historical data, an order of priority among the one or more related beams, wherein the historical data, upon which the order of priority is based, includes at least one of:

historical signal strengths associated with the one or more related beams, or

QoS data associated with the one or more related beams; and wherein the second information is based on the order of priority.

11. The non-transitory computer-readable medium of claim 8, wherein the one or more instructions further cause the device to:

monitor signal strength measurements provided by the UE;

determine, based on the monitoring, that a location of the UE changed;

select, based on determining that the location of the UE changed, one or more other related beams; and provide the UE with updated information relating to the one or more other related beams.

12. The non-transitory computer-readable medium of claim 8, wherein the one or more instructions further cause the device to:

determine a signal signature based on the particular signal strength of the particular beam; and wherein the one or more instructions, that cause the device to select the one or more related beams, cause the device to:

select the one or more related beams further based on the signal signature.

13. The non-transitory computer-readable medium of claim 12, wherein the one or more instructions further cause the device to:

determine another signal strength of another beam; and wherein the one or more instructions, that cause the device to determine the signal signature, cause the device to:

determine the signal signature further based on the other signal strength of the other beam.

14. The non-transitory computer-readable medium of claim 8, wherein the historical data relates to historical signal strengths associated with the particular beam and the one or more related beams.

15. A device, comprising:

one or more processors configured to:

obtain, from a user equipment (UE), first information relating to a particular signal strength associated with a particular beam;

determine, based on historical data, that the particular beam and one or more related beams are associated with one or more of:

a particular network slice, or a particular quality of service (QoS) flow;

select, based on the particular beam, the one or more related beams that are associated with the particular beam based on the determination; and provide, to the UE, second information that identifies the one or more related beams selected, to permit the UE to communicate using the one or more related beams.

16. The device of claim 15, wherein the one or more processors are further configured to:

determine, based on the historical data, an order of priority among the one or more related beams, wherein the historical data, upon which the order of priority is based, includes at least one of:

historical signal strengths associated with the one or more related beams, or quality of service (QoS) data associated with the one or more related beams; and wherein the second information is based on the order of priority.

17. The device of claim 15, wherein the one or more processors are further configured to:

monitor signal strength measurements provided by the UE;

determine, based on the monitoring, that a location of the UE changed;

select, based on determining that the location of the UE changed, one or more other related beams; and provide the UE with updated information relating to the one or more other related beams.

18. The device of claim 15, wherein the one or more related beams are associated with the particular beam based on historical signal strengths associated with the one or more related beams satisfying a threshold value.

19. The device of claim 15, wherein the historical data relates to historical signal strengths associated with the particular beam and the one or more related beams.

20. The device of claim 19, wherein the one or more related beams are associated with the particular beam based on the historical signal strengths associated with the one or more related beams satisfying a threshold value.

* * * * *